United States Patent
Lambrecht et al.

(10) Patent No.: US 6,168,143 B1
(45) Date of Patent: Jan. 2, 2001

(54) PNEUMATIC SPRING

(75) Inventors: Dirk Lambrecht, Hamburg; Holger Oertel, Revenahe, both of (DE)

(73) Assignee: Phoenix Aktiengesellschaft, Hamburg (DE)

(*) Notice: Under 35 U.S.C. 154(b), the term of this patent shall be extended for 0 days.

(21) Appl. No.: 09/171,725

(22) PCT Filed: Apr. 28, 1997

(86) PCT No.: PCT/DE97/00854

§ 371 Date: Oct. 23, 1998

§ 102(e) Date: Oct. 23, 1998

(87) PCT Pub. No.: WO97/42429

PCT Pub. Date: Nov. 13, 1997

(30) Foreign Application Priority Data

May 7, 1996 (DE) ............................................. 196 18 168

(51) Int. Cl.$^7$ ........................................................... F16F 9/04
(52) U.S. Cl. ........................................ 267/64.24; 267/122
(58) Field of Search .............................. 267/122, 64.19, 267/64.21, 64.23, 64.24, 64.27

(56) References Cited

U.S. PATENT DOCUMENTS

| | | |
|---|---|---|
| 3,765,733 | 10/1973 | Hackman . |
| 3,854,557 * | 12/1974 | Wilcox ................................ 188/322 |
| 3,864,922 * | 2/1975 | Dial et al. ............................. 267/65 |
| 3,907,122 * | 9/1975 | Ksienysk et al. ................... 267/57.1 |
| 5,338,055 * | 8/1994 | Mauz ..................................... 267/280 |
| 5,544,715 * | 8/1996 | Phillips .............................. 267/140.3 |

FOREIGN PATENT DOCUMENTS

| | | |
|---|---|---|
| 3828203 | 3/1990 | (DE) . |
| 554573 | 3/1996 | (EP) . |
| 2 284 237 | 11/1993 | (GB) . |
| WO94/13967 | 6/1994 | (WO) . |
| WO95/09092 | 4/1995 | (WO) . |

OTHER PUBLICATIONS

JP 07243475A, Sep. 19, 1995, In: "Patent Abstracts of Japan", vol. 096, No. 001, Jan. 31, 1996.

* cited by examiner

Primary Examiner—Christopher P. Schwartz
Assistant Examiner—Devon Kramer
(74) Attorney, Agent, or Firm—Collard & Roe, P.C.

(57) ABSTRACT

A pneumatic spring, in particular for rail vehicles, trucks and busses, has a bellows made of elastomer material, if required provided with reinforcing inserts; a pot to whose upper part the bellows are secured, the bellows preferably rolling on the outer wall of the pot; a plate-shaped cover spaced apart from the pot and to which the other end of the bellows is secured; a central rod firmly secured to the cover and which projects out of the lid over a distance extends parallel to the bellows and enters the pot; a ball-and-socket joint located between the pot and the rod and supported against the inner wall of the pot; an air pipe; a slide bush arranged between the ball-and-socket joint and the rod and guided on the outer wall of the rod; and an intermediate bush arranged between the ball-and-socket joint and the slide bush.

22 Claims, 2 Drawing Sheets

PNEUMATIC SPRING

BACKGROUND OF THE INVENTION

1. Field of the Invention

The invention relates to a pneumatic spring in particular for rail vehicles, utility vehicles and busses, comprising a bellows made of elastomer material provided with reinforcing inserts, if required; a pot to whose upper part the bellows is secured, whereby the bellows preferably rolls along the outer wall of the top; a plate-shaped cover arranged spaced from the pot, with the other end of the bellows being secured on said cover; a centrally arranged rod firmly secured on the cover and particularly projecting from the cover, whereby, furthermore, the rod extends parallel with the bellows and immerses in the top; a ball-and-socket joint located between the top and the rod and supported on the inner wall of the pot; as well as a an air pipe (DE-A-38 28 203; EP-A-0 554 573).

2. The Prior Art

Pneumatic springs are frequently employed as secondary spring systems, for example in modern rail-borne vehicles. Such a secondary spring system is expected to be capable of statically conducting horizontal forces of up to 20 KN to the body, namely from the box of the vehicle, permitting in this connection angular deflections of up to 7°. Furthermore, extensive vertical paths of displacement are required combined with low structural heights and a low weight.

SUMMARY OF THE INVENTION

Now, for achieving the object of the invention a pneumatic spring of said type, comprises a combination of the following additional components:

A slide bush, which is arranged between the ball-and-socket joint and the rod and guided sliding on the outer wall of the rod, as well as an intermediate bush, which is located between the ball-and-socket joint and the slide bush.

The intermediate bush, the slide bush and the ball-and-socket joint operate cylindrically around the rod. The rod (also referred to as a guide shaft) thus forms the core of the overall system. The slide bush and the intermediate bush are each preferably designed as one piece. The slide bush, with has a minimum wall thickness of 0.1 mm, consists of a plastic material capable of sliding, in particular of polytetrafluoroethylene. For the purpose of easier installation, the slide bush has a slot extending through slanted in the axial direction. Concerning the intermediate bush, a thermally conductive material is used, in particular aluminum. A substantial reduction in weight is connected with the use of aluminum as well.

The following variations are usefully employed with respect to the conduction of air:

The tubular rod is provided with at least one opening, which connects the inner space of the rod extending through in the axial direction with the space of the pneumatic spring.

At least one through-extending channel or outer groove is arranged within the intermediate bush in the axial direction, said channel or groove being communicatively connected with the space of the pneumatic spring. Advantageously, several channels or outer grooves are present, which are distributed over the entire circumference of the intermediate bush with substantially equal spacings in between. Air cooling is additionally made available in this way.

A combination of both variations of air conduction is possible as well.

Additional useful designs of the pneumatic spring as defined by the invention are:

The inner wall of the tubular rod is shaped conical within the zone of the slide bush, namely with enlargement of the diameter of the inner space of the rod, which leads to weight saving. An optimization of the conduction of air is connected herewith as well.

The diameter of the ball-and-socket joint amounts to 100 to 200 mm, in particular 130 to 150 mm based on the structural component with the smallest diameter. When a three-layer metal-elastomer composite is used, the elastomer layer arranged in the center has a thickness of 5 to 15 mm, in particular 6 to 10 mm.

The ball-and-socket joint is secured relative to the lower part of the pneumatic spring, in particular in the form of at least one safety ring.

The intermediate bush is secured relative to the lower part of the pneumatic spring as well, in particular in the form of a safety ring, which locks in a notching within the outer surface of the intermediate bush.

BRIEF DESCRIPTION OF THE DRAWINGS

Now, the invention is explained with the help of an exemplified embodiment with reference to schematic drawings, in which.

Figure 1:
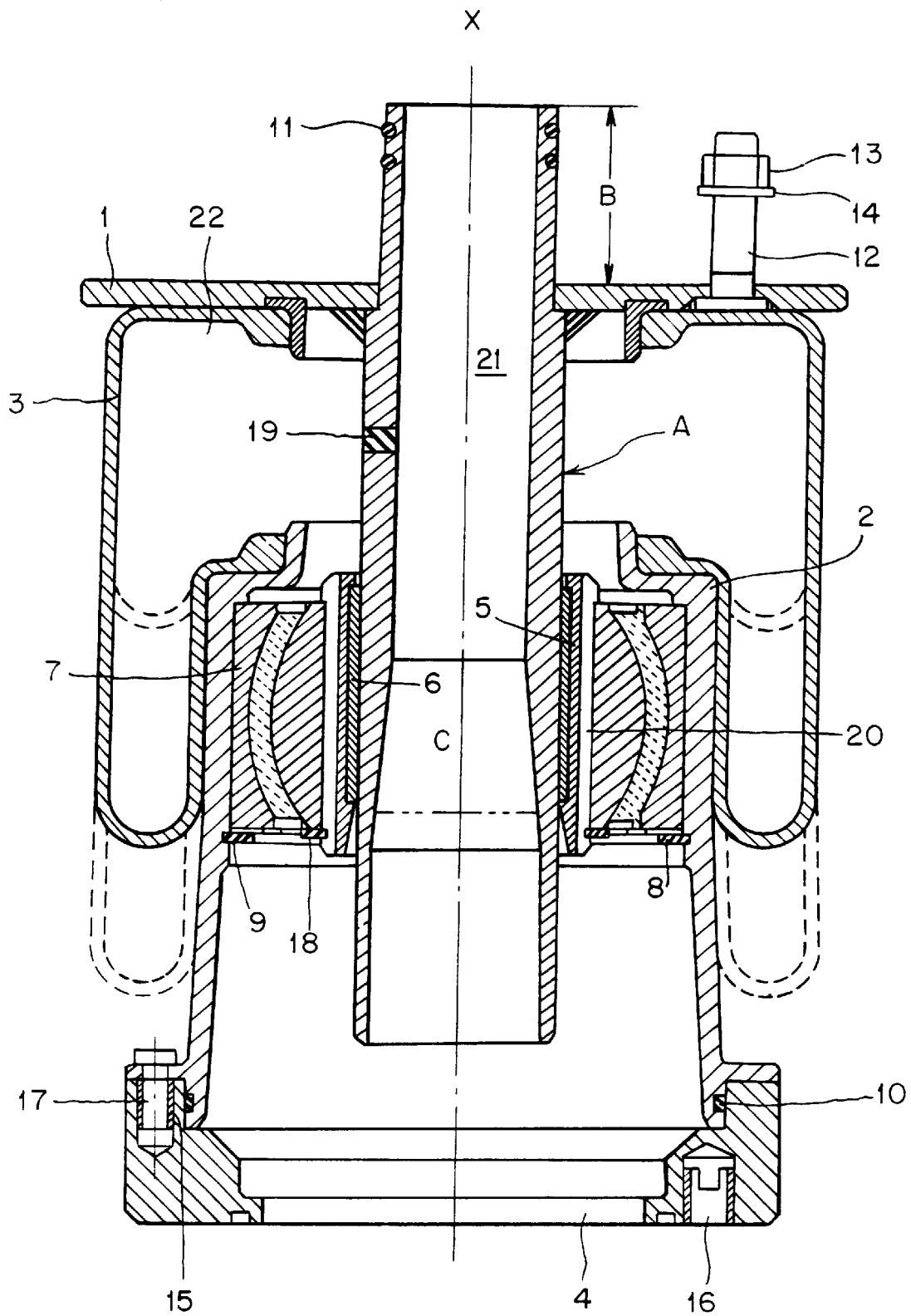
FIG. 1 shows an axial section through the pneumatic spring.

The following list of reference numerals and letters is applicable in connection with said figures:

1 Plate-shaped cover
2 Pot (roll-off piston)
3 Bellows made from elastomer material (rubber of rubber-like plastic)
4 Flange
5 Intermediate bush
6 Slide bush
7 Ball-and-socket joint as a three-layer metal-elastomer composite
8 Fitted disk
9 Safety ring
10 O-ring
11 O-ring
12 Weld-in screw
13 Hexagonal nut
14 Disk
15 Thread insert
16 Thread insert
17 Female hexagon
18 Safety ring
19 Air pipe within rod
20 Air pipe within intermediate bush
21 Inner space of rod
22 Space of pneumatic spring
23 Recess on inner wall of intermediate bush
24 Recess on outer wall of intermediate bush
A Rod (tubular rod)
B Projection
C Cone zone
X Axial direction

DETAILED DESCRIPTION OF PREFERRED EMBODIMENTS

According to FIG. 1, the intermediate bush (5) has a recess (23, FIG. 2) on its inner wall, in which recess the slide bush is seated with about half of the wall thickness and supported sliding on the outer wall of the tubular rod (A). Furthermore, the intermediate bush (5) is provided with a recess (24, FIG. 2) on its outer wall as well, in which recess the ball-and-socket joint (7) as a three-layer metal-elastomer composite is seated with its inner part. For securing the ball-and-socket joint (7) and the intermediate bush (5), two safety rings (9, 18) are present toward the lower part of the pneumatic spring, whereby safety ring (18) locks in a notching located within the outer wall of the intermediate bush. The tubular rod (A) comprises as an air conduction pipe (19) at least one opening, which connects the inner space (21) of the rod with the space (22) of the pneumatic spring. Furthermore, within the zone (C) of the slide bush (6), the tubular rod (A) has a conical shape, namely with enlargement of the diameter of the inner space (21) of the rod.

Figure 2:
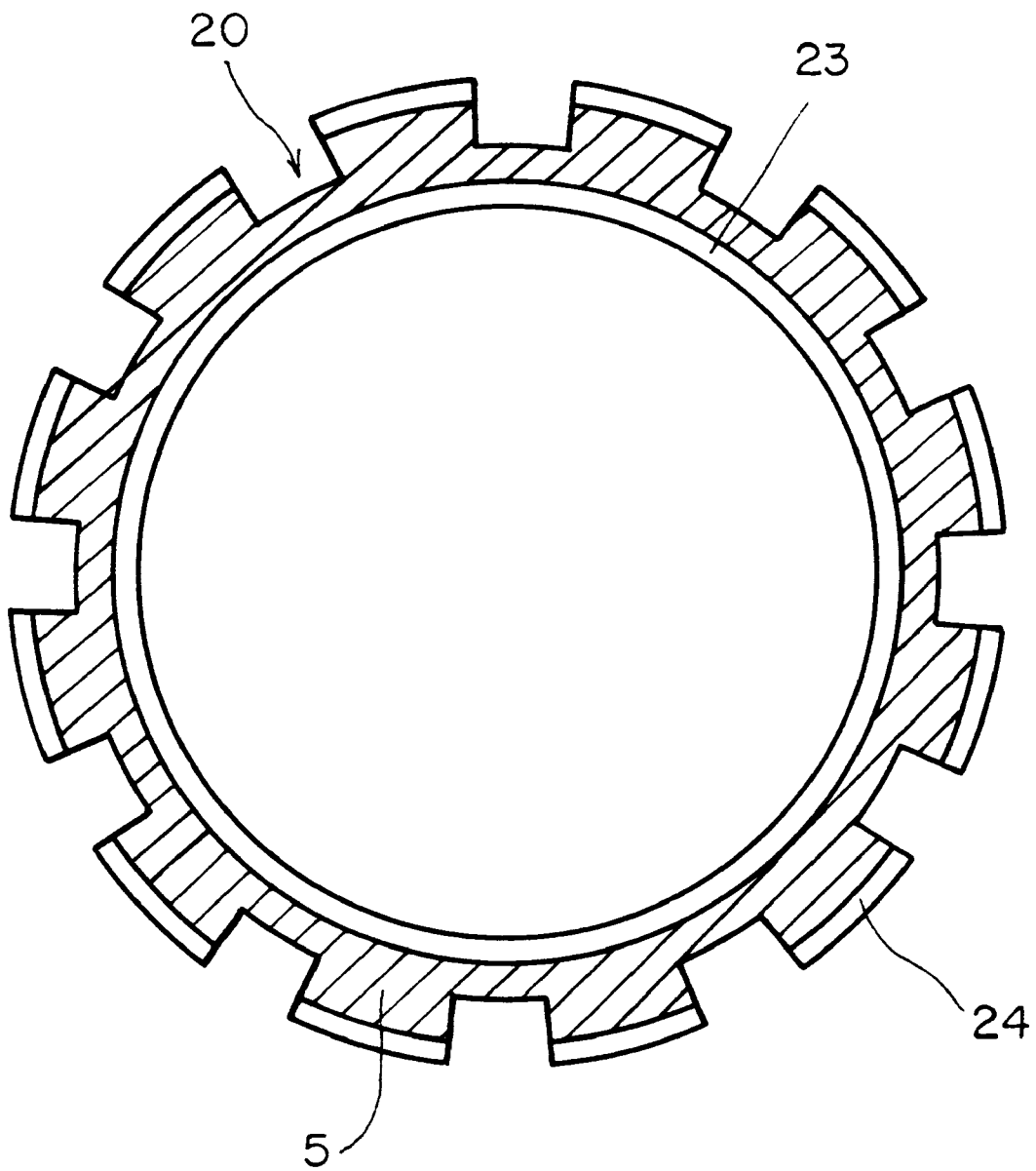
FIG. 2 shows a radial section through the intermediate bush.

FIG. 2 shows an air conduction pipe (20), which is arranged within the intermediate bush (5) in the axial direction (X, FIG. 1) and connected with the space of the pneumatic spring. The air conduction system consists here of a number of outer grooves, which are present distributed over the entire circumference of the intermediate bush (5) with substantially equal spacings in between. On its inner and outer walls, the intermediate bush is provided with recesses (23, 24); their purpose has been explained above in connection with the description of FIG. 1.

What is claimed is:

1. A pneumatic spring in particular for rail vehicles and busses, comprising
   a bellows (3) made of elastomer material;
   a pot (2), on an upper part of which the bellows (3) is secured, whereby the bellows rolls off along an outer wall of the pot;
   a plate-shaped cover (1) arranged with a spacing from the pot (2), with the other end of the bellows (3) being secured on said cover;
   a centrally arranged rod (A) firmly connected with the cover (1) and protruding from the cover with a projection (B), whereby the rod, furthermore, immerses in the pot (2), extending parallel with the bellows (3);
   a ball-and-socket joint (7) located between the pot (2) and the rod (A) and supported on an inner wall of the pot, whereby the ball-and-socket joint is a metal-elastomer composite consisting of three layers and formed by two metal layers and an elastomer layer arranged in the middle;
   an air conduction system (19, 20);
   a slide bush (6) is arranged between the ball-and-socket joint (7) and the rod (A), said slide bush being supported sliding on an outer wall of the rod,
   an intermediate bush (5) is present, said bush being located between the ball-and-socket joint (7) and the slide bush (6);
   whereby the intermediate bush (5), the slide bush (6) and the ball-and-socket joint (7) extend cylindrically around the rod (A).

2. The pneumatic spring according to claim 1, wherein the thickness of the elastomer layer of the ball-and socket joint (7) is from 5 to 15 mm.

3. The pneumatic spring according to claim 1, wherein the diameter of the ball-and-socket joint (7) is from 100 to 200 mm based on the structural component with the smallest diameter.

4. The pneumatic spring according to claim 1, wherein the rod is a tubular rod with formation of an inner space (21) of the rod extending through in an axial direction (X).

5. The pneumatic spring according to claim 4, wherein an inner wall of the tubular rod (A) is conical within a zone (C) of the slide bush (6), with enlargement of the diameter of the inner space (21) of the rod.

6. The pneumatic spring according to claim 1, wherein the slide bush (6) and the intermediate bush (5) each are in one piece.

7. The pneumatic spring according to claim 1, wherein the slide bush (6) consist of a plastic capable of sliding.

8. The pneumatic spring according to claim 1, wherein the slide bush (6), has a minimum wall thickness of 0.1 mm.

9. The pneumatic spring according to claim 1, wherein the slide bush (6), has a slot extending through slanted in an axial direction (X).

10. The pneumatic spring according to claim 1, wherein the intermediate bush (5) consists of a thermally conductive material.

11. The pneumatic spring according to claim 1, wherein on its inner wall, the intermediate bush (5) has a recess (23) in which the slide bush (6) is seated with about half of the wall thickness.

12. The pneumatic spring according to claim 1, wherein on an outer wall the intermediate bush (5) has a recess (24) in which the ball-and-socket joint (7) is seated with an inner part.

13. The pneumatic spring according to claim 4, wherein air pipe (19) comprises at least one opening connecting an inner space (21) of the rod with a space (22) of the pneumatic spring.

14. The pneumatic spring according to claim 1, wherein the air conduction system (20) comprises at least one through-extending channel outer groove arranged within the intermediate bush (5) in an axial direction (X) and being in connection with a space (22) of the pneumatic spring.

15. The pneumatic spring according to claim 14, wherein the air conduction system (20) consists of a plurality of channels distributed over an entire circumference of the intermediate bush (5) with substantially equal spacings in between.

16. The pneumatic spring according to claim 1, wherein the ball-and-socket joint (7) is secured against a lower part of the pneumatic spring in the form of at least one safety ring (9, 18).

17. The pneumatic spring according to claim 1, wherein the intermediate bush (6) is secured against a lower part of the pneumatic spring in the form of a safety ring (18) locking in a notching located within an outer wall of the intermediate bush (5).

18. The pneumatic spring according to claim 1,
   wherein the bellows (3) is made of elastomer material which is provided with reinforcing inserts.

19. The pneumatic spring according to claim 2,
   wherein the thickness of the elastomer layer of the ball-and-socket joint (7) is from 6 to 10 mm.

20. The pneumatic spring according to claim 3,
   wherein the diameter of the ball-and-socket joint (7) is from 130 to 150 mm based on the structural component with the smallest diameter.

21. The pneumatic spring according to claim 7,
   wherein the slide bush (6) consist of polytetrafluoroethylene.

22. The pneumatic spring according to claim 10,
   wherein the intermediate bush (5) consists of aluminum.

* * * * *